US009107254B2

(12) United States Patent
Zhang et al.

(10) Patent No.: US 9,107,254 B2
(45) Date of Patent: Aug. 11, 2015

(54) METHOD AND APPARATUS FOR LED LIGHTING

(75) Inventors: Jiqiang Zhang, Guizhou (CN); Zheyuan Zhang, Guizhou (CN)

(73) Assignee: Guizhou Guangpusen Photoelectric Co., Ltd., Guizhou (CN)

( * ) Notice: Subject to any disclaimer, the term of this patent is extended or adjusted under 35 U.S.C. 154(b) by 222 days.

(21) Appl. No.: 13/984,212

(22) PCT Filed: Aug. 30, 2011

(86) PCT No.: PCT/CN2011/079121
§ 371 (c)(1),
(2), (4) Date: Oct. 28, 2013

(87) PCT Pub. No.: WO2012/028088
PCT Pub. Date: Mar. 8, 2012

(65) Prior Publication Data
US 2014/0049170 A1    Feb. 20, 2014

(30) Foreign Application Priority Data

| Sep. 3, 2010 | (CN) | 2010 1 0271838 |
| Sep. 3, 2010 | (CN) | 2010 1 0271850 |
| Nov. 1, 2010 | (CN) | 2010 1 0527980 |
| Nov. 30, 2010 | (CN) | 2010 2 0635866 U |
| Dec. 3, 2010 | (CN) | 2010 1 0573280 |

(51) Int. Cl.
*H05B 37/00* (2006.01)
*H05B 39/00* (2006.01)
*H05B 41/00* (2006.01)
*H05B 33/08* (2006.01)
*H05B 33/10* (2006.01)

(52) U.S. Cl.
CPC ........ *H05B 33/0809* (2013.01); *H05B 33/0854* (2013.01); *H05B 33/10* (2013.01); *Y02B 20/341* (2013.01); *Y10T 29/49128* (2015.01)

(58) Field of Classification Search
CPC ............ H05B 33/0803; H05B 33/0827; F21Y 2101/02
USPC .................. 315/185 R, 186, 189, 192; 363/65
See application file for complete search history.

(56) References Cited

U.S. PATENT DOCUMENTS

2010/0295460 A1*  11/2010  Lin et al. ........................ 315/193

FOREIGN PATENT DOCUMENTS

| CN | 201054825 |   | 4/2008 |
| CN | 201054825 Y | * | 4/2008 |
| CN | 101754514 |   | 6/2010 |
| CN | 101754514 A | * | 6/2010 |

(Continued)

OTHER PUBLICATIONS

PCT/CN2011/079121 International Search Report & Written Opinion (with English Translation) mailed Oct. 27, 2011, 29 pages.

*Primary Examiner* — Dylan White
(74) *Attorney, Agent, or Firm* — Lathrop & Gage LLP

(57) ABSTRACT

A LED lighting device has been disclosed. The LED lighting device comprises an LED array composed of a plurality of LED light module groups, each LED light module group comprising a plurality of LEDs connected in series; and at least one constant current diode (CRD) configured to keep a current received from a power supply constant and to drive the LEDs in the plurality of LED light module groups to emit light via the constant current. In addition, a method for forming a LED lighting device and a LED lighting integrated chip are provided.

16 Claims, 9 Drawing Sheets

(56) References Cited

FOREIGN PATENT DOCUMENTS

| CN | 101883463 | 11/2010 | | |
|---|---|---|---|---|
| CN | 101909393 | 12/2010 | | |
| CN | 101917810 | 12/2010 | | |
| CN | 102006695 | 4/2011 | | |
| CN | 102056376 | 5/2011 | | |
| CN | 201887987 | 6/2011 | | |
| EP | 2239996 | * 9/2009 | ............ | H05B 33/08 |

* cited by examiner

METHOD AND APPARATUS FOR LED LIGHTING

TECHNICAL FIELD

The present application relates to a field of LED lighting technology, more particular, to a LED lighting method and a LED lighting device.

BACKGROUND

LED lighting has advantages of high efficiency and energy-saving. The luminous efficiency of the most of the current LED lights may be more than 70 LM/W, and thus the current LED lights may save more energy than conventional energy-saving lamps. Theoretically, the luminous efficiency of a green LED can be up to 683 LM/W; and the luminous efficiency of a white LED may be up to 182.45 LM/W. Compared with the 360 degree luminous way of the conventional lighting, LED is a unidirectional point light source and thus its lighting direction may be easily and optically controlled. In this regard, the lighting efficiency of LED is much higher than the same of the conventional lighting device. In addition, the color rendering of LED is also higher than the same of the conventional lighting device, and it is easy to implement light illumination control for LED, which makes a massive promotion development space of LED lighting. However, the overheating of LED will cause its luminous efficiency drops rapidly so as to form a so-called "Lumens Depreciation". The withstanding voltage of a LED is about 3.2 V (3.0~3.5 V). Theoretically, light output of the LED is associated with the drive current, and is independent of the power supply voltage. Unstable supply of the drive current will make the LED overheating, such that the luminous efficiency of the overheated LED drops rapidly so as to form a so-called "Lumens Depreciation".

The supply voltage of most exiting LED optical modules is lower than 48 V. In order to achieve constant current effect, the most of the power supply circuits has a complex structure, a low efficiency and a high cost. This causes the structure of the LED lights is large and the price is high. Therefore, the development of the LED light is limited to a certain extent.

Additionally, under the current LED light design, a LED chip is packaged into a separate chip module. A bridge rectifier, a rectifier diode, and a constant current diode also are packaged into separate elements, respectively. The lighting manufacturers first incorporate these independent elements onto a circuit board to form an integrated LED circuit board, and then assemble the LED circuit board with a light body together to form a LED light. Therefore, the whole production process becomes a long-time process with a high cost and a low efficiency.

SUMMARY

The object of the present invention is to provide a LED lighting method and device, which can improve the luminous efficiency of the LED and simplify the structure of the LED lighting device to reduce the cost to facilitate industrial production.

According to one embodiment of the present application, a LED lighting method is provided, including: driving LEDs to emit light by a power supply via a constant current effect of a constant current diode (CRD); wherein LED light module groups and the constant current diode are packaged and integrated into a chip to form a LED light module group integrated chip, and wherein the constant current diode has negative power characteristic which enables the integrated chip to have the negative power physical characteristic, thereby, when an operating temperature of the integrated chip is too high, the constant current diode will automatically reduce a circuit power input to reduce the temperature of the integrated chip so as to protect it from lumens depreciation due to overheating.

In the aforementioned method, controllable impulses are output by using a impulse source, and the output impulses are rectified by a diode to enable the CRD with a controlling end to be switched on discontinuously at a controlled impulse frequency such that the LED light module groups can be powered discontinuously by the power supply and the LED light module groups flash discontinuously at the controlled frequency, thereby, based on a feature that the human eye is not sensitive to high-frequency of flicker, in the case of power supply is halved, a lighting effect of the LED light module groups is near normal lighting effect to achieve energy saving goals, so that the input power is reduced and the LED light module groups can be further protected from lumens depreciation due to the overheating; or the alternating current is kept constant and rectified by using a parallel group of constant current diodes in order to enable the alternating current to drive two series groups of the LED light module groups at the up and down half waves in a period, respectively, such that the two series groups flash alternately, wherein the parallel group of constant current diodes are composed of a forward connected constant current diode and a backward connected constant current diode; thereby, based on a feature that the human eye is not sensitive to high-frequency of flicker, in the case of power supply is halved, the lighting effect of the LED light module groups is near normal lighting effect to achieve energy saving goals.

In the aforementioned method, the power supply can be a super-capacitor C charging by a solar cell or can be a power supply whose AC power is converted by a bridge rectifier circuit to a DC output.

A LED lighting device (in DC power supply mode) including LED light module groups and a constant current diode (CRD), the LED light module groups and the CRD are connected in series, the LED light module groups comprises a plurality of LEDs connected in series; wherein the LEDs are arranged as an array with multiple rows and multiple columns when packaging a chip; the constant current diode and LED light module groups being packaged and integrated into the chip. More than one of LED light module groups can be used in series or parallel.

In the aforementioned LED lighting device, a controlling end of the constant current diode is connected to a PWM impulse source via a diode D1.

In the aforementioned LED lighting device, the power supply is a super-capacitor C connected in parallel to both sides of a solar panel U, and a rectifier diode D2 is connected in series to the solar panel U.

In the aforementioned LED lighting device, the power supply is a AC power supply with both ends connected to bridge rectifier circuits.

A LED lighting device, wherein the device receives power in AC power supply mode and comprises: a parallel group of constant current diodes composed of a forward connected constant current diode and a backward connected constant current diode and a LED light module group, wherein the LED light module groups and the constant current diode parallel group are connected in series; the constant current diode parallel group, the LED light module group and a AC power supply form a closed loop; the LED light module group is composed of a plurality of LEDs connected in series in a forward direction and a plurality of LEDs connected in series in a backward direction, the forward connected LEDs and the backward connected LEDs are connected in parallel.

In the aforementioned LED lighting device, the constant current diode parallel group and the LED light module group are provided in the same chip, and the LEDs in the LED light module group are arranged to an interval arrangement with one row in forward direction and the adjacent row in backward direction when packaging the chip, the LED light module group is arranged to M rows and N columns, more than one of LEM light module groups can be used in series or parallel.

In the aforementioned LED lighting device, the power supply of the lighting device can be an electric supply with a frequency of 50 Hz/S or 60 Hz/S, or a AC power supply provided by a transducer with a higher power frequency.

In the aforementioned LED lighting device in AC power supply mode, each LED series circuit in the LED light module group includes M×N/2 LEDs connected in series.

An AC/DC LED lighting circuit comprising two supply terminals J1 and J2, a rectifier bridge B1 whose input end is connected to the supply terminals J1 and J2, a LED light module group D3, a constant current diode D4 and a diode D6 connected to an output end of the rectifier bridge B1, the LED light module group D3, the constant current diode D4 and the diode D6 are connected in series; the constant current diode D4 and the diode D6 are connected in parallel to a series circuit consisting of the constant current diode D5 and a diode D7, in which a conductive direction of D4 and D6 is opposite to D5 and D7. Each of constant current diodes D4 and D5 and the LED light module group D are packaged into a chip.

In the aforementioned AC/DC LED lighting circuit, the constant current diodes D4 and D5 are consist of a plurality of constant current diode connected in series or parallel.

In the aforementioned AC/DC LED lighting circuit, the supply terminals J1 and J2 are connected with a transient diode D8, and the supply terminal J1 is further in series connected with a resettable fuse F1 (against overload, overvoltage, and overheating).

In the aforementioned AC/DC LED lighting circuit, the output end of the rectifier bridge B1 is further in parallel connected with a filter capacitor C1, and a series circuit consisting of the LED light module group D3, the CRD D4 and the diode D6 is further in series connected with a resistor R1.

In the aforementioned AC/DC LED lighting circuit, control ends of the constant current diodes D5 and D4 are connected to a preparatory terminal J3.

A method for improving the luminous efficiency of LED, wherein a LED drive current is controlled by a constant current diode, at the same time the LED is used as a heat source for the constant current diode; and wherein the heat source affects the ambient temperature of the constant current diode, such that an operating mode between the LED and the constant current diode is formed to enable the LED and the constant current diode to adjust for each other on the basis of feedback.

In the aforementioned method for improving the luminous efficiency of LED, in the operating mode, when the operating temperature of the LED is higher than a control temperature, the ambient temperature of the constant current diode is heated to a temperature above a prohibited temperature, such that a rated power supplied from the constant current diode to the LED decreases as the ambient temperature increases so as to protect the temperature of the LED from rising to avoid a luminous efficiency of the LED to be reduced due to overheating. The control temperature is the temperature which the LED cannot exceed, and the control temperature can be determined on the basis of the characteristics of LED chip group 2 or specific requirements.

In the aforementioned method for improving the luminous efficiency of LED, the heating elements comprise a resistance element, a ceramic element, a mica element, a flexible element or a field effect tube.

In the aforementioned method for improving the luminous efficiency of LED, the prohibited temperature comprises an upper limit of the ambient temperature at which the constant current diode can keep normal constant current characteristic, when the ambient temperature is higher than the prohibited temperature, the rated power of the constant current diode decreases as the ambient temperature increases.

In the aforementioned method for improving the luminous efficiency of LED, the heating elements is spatially close to the constant current diode or connected to the constant current diode via heat-conducting medium.

An integrating method of a LED lighting circuit comprising packaging a rectifier circuit, a constant current diode and a LED together to form a LED lighting integrated chip.

In the aforementioned integrating method of a LED lighting circuit, the rectifier circuit comprises a rectifier bridge and/or a rectifier diode.

In the aforementioned integrating method of a LED lighting circuit, the LED lighting integrated chip leads externally a adjust end of the constant current diode and a power interface.

In the aforementioned integrating method of a LED lighting circuit, the LED lighting integrated chip leads externally a wire to connect to a capacitor.

In the aforementioned integrating method of a LED lighting circuit, the LED lighting circuit includes a power supply, the both sides of the power supply are connected to input ends of a rectifier bridge B2, output ends of the rectifier bridge B2 are connected to a LED light module group D9 composed of LED, a constant current diode D10 and a diode D12, in which the LED light module group D9, the constant current diode D10 and the diode D12 are connected in series; the constant current diode D10 and the rectifier diode D12 are connected in parallel with the series circuit consisting of the constant current diode D11 and the rectifier diode D13, in which the direction of D10 and D12 is opposite to the direction of Dl land D13.

In the aforementioned integrating method of a LED lighting circuit, the constant current diodes D10 and D11 are constant current diode group with a plurality of constant current diodes connected together in series or parallel.

In the aforementioned integrating method of a LED lighting circuit, output ends of the rectifier bridge B2 are further connected with a filter capacitor C2 in parallel.

A LED lighting integrated chip comprising a rectifier circuit chip, a constant current diode chip and a LED chip in a LED lighting circuit, and the rectifier circuit chip, the constant current diode chip and the LED chip are packaged into a LED support.

In the aforementioned LED lighting integrated chip, the rectifier circuit includes a rectifier bridge and/or a rectifier diode; the LED lighting integrated chip leads externally a adjust end of the constant current diode and a power interface; and the LED lighting integrated chip further provides with a wire to connect to a capacitor.

In the aforementioned LED lighting integrated chip, the LED lighting circuit comprises a power supply, both sides of the power supply are connected to input ends of a rectifier bridge B2, output ends of the rectifier bridge B2 are connected to a LED light module group D9 consisting of LED, a constant current diode D10 and a diode D12, in which the LED light module group D9, the constant current diode D10 and the diode D12 are connected in series; the constant current diode D10 and the rectifier diode D12 are connected in parallel with the series circuit consisting of the constant current diode D11 and the rectifier diode D13, in which the direction of D10 and D12 is opposite to the direction of D11 and D13; the constant current diodes D10 and D11 are constant current diode group with sa plurality of constant current diodes connected together in series or parallel; and the output ends of the rectifier bridge B2 are further connected with a filter capacitor C2 in parallel.

Comparing to the prior art, the method according to the present invention simplifies effectively the structure of the LED lighting circuit. In the present invention, the LED light module group integrated chip is used to protect the LED from lumens depreciation due to the overheating, so that the energy consumption is further reduced. According to the present invention, the DC output current can be converted to a stable impulse current output with a controllable impulse width, the controllable CRD can be discontinuously switched on via the diode D1 at the controllable impulse frequency. Therefore, the LED light module group can be powered discontinuously at the controllable frequency and thus can flash discontinuously at the controllable frequency. Alternatively, using the alternating current to drive two series groups in the LED light module groups at the up and down half waves in a period, respectively, such that the two series groups flash alternately. Therefore, based on a feature that the human eye is not sensitive to high-frequency of flicker, in the case of power supply is halved, the brightness effect perceived by human eye can be up to 80W if the input power of the LED light (with a rated power of 100W) is 50W (but the instrument testing result is still 50W), so that the actual power saving can be up to 40%. In addition, when providing the same lighting effect, comparing to the conventional LED powered by DC, the LED light module group according to the present invention needs lower input power, so that the heat from the LED is sufficiently reduced and thus the LED can be protected from lumens depreciation due to the overheating to further reduce the energy consumption. Furthermore, in the present invention, the supply current of the LED can be very stable via the CRD, so that the overheating of the LED can be avoided and thus the luminous efficiency of the LED can be improved and the energy consumption is reduced simultaneously. The device and method according to the present invention can make the production of the LED light become very simple and inexpensive, and this will help to improve the speed of the promotion and application of LED lighting.

The AC/DC LED lighting circuit according to the present invention simplifies effectively the structure of the LED lighting circuit. The AC/DC LED lighting circuit can be powered not only by the AC power supply but also by the DC power supply. In addition, the supply current of the LED can be very stable via the CRD, so that the overheating of the LED can be avoided and thus the luminous efficiency of the LED can be improved and the energy consumption is reduced simultaneously. The structure of the lighting circuit according to the present invention can make the production of the LED light become very simple and inexpensive, and this will help to improve the speed of the promotion and application of LED lighting. The lighting circuit of the present invention can avoid the change of the power supply caused by variation of the upstream LED chip and the requirements to the appearance of the power supply caused by downstream different lighting. Furthermore, the lighting circuit of the present invention has a simple structure and a low cost, and thus the demand for changing the power supply upstream and downstream only needs to be satisfied by adjusting the standard and the number of the constant current diode to make the ordinary lighting manufacture more sustainable and scale to provide basis for a further LED scale.

In the method for improving the luminous efficiency of LED according to the present invention, the LED drive current is controlled by a constant current diode, at the same time the LED is used as the heat source of the constant current diode, and the operating mode is formed to enable the LED and the constant current diode to adjust for each other on the basis of feedback. When the temperature of the LED is higher than the control temperature, the heat from the LED and the heating elements designed for heating the CRD as well as heat from the heating elements of the circuit itself enable the temperature of the constant current diode to reach the prohibited temperature, such that the output power of the CRD is decreased rapidly to make the power of the LED and the temperature decrease. After the temperature is decreased to a certain extent, the output power to the LED is increased to ensure the luminance. The above adjustment is repeatedly to make the LED always operate at a relative lower temperature, but it's luminance will not be too low. This can suppress the generation of the lumens depreciation to improve the luminous efficiency of the LED and to ensure the normal life of the LED.

In the integrating method of a LED lighting circuit according to the present invention, the rectifier circuit, the constant current diode and the LED are packaged together to form a LED lighting integrated chip. Therefore, for the LED lighting manufacture, it only needs to weld the LED lighting integrated chip onto a light house to obtain the LED lighting product. This will significantly reduce the production processes and production cost, and will help the industrialization of the LED energy-saving lighting products. For example, to produce a 10W ball lamp, according to the method of the present invention, all the key elements (rectification element, constant current element, and LED light-emitting element) associated with the LED lighting are packaged and integrated into a small volume of ¢13×1 mm (diameter×thickness). The manufacturer only needs to mount the LED lighting integrated chip with small volume to the lamp and then to weld a wire to connect the power supply to obtain a LED lighting product. In the contrary, in the method which uses independent element to manufacture a LED lamp, first there is a need to buy the power supply for the lamp manufacture, and the volume is larger than ¢25×25 mm (diameter×thickness), then there is a need to buy the LED chip and other elements to package onto the PCB. Because the other elements are packaged independently, their volume must be large, so that the volume of the PCB is larger than ¢50×1 mm (diameter× thickness). Finally, the power supply and the PCB are weld and mounted to the light house. This will cause lengthy procedures throughout the production process, many management control links and a high cost of production. In particularly, any change of the LED chip will cause the change of the power supply standard, meanwhile different lamp also gives a strict size requirements to the power supply to cause small quantities and a high price of the power supply. In the other hand, the power supply is embedded within the narrow space of the ball lamp, which is unfavorable to the heat dissipation of the power supply. In addition, the LED itself issues heat, and thus the heat from the power supply and the LED aggravate the aging of the power components and the LED chip, so that the life of the LED lighting is greatly reduced.

Figure 12:
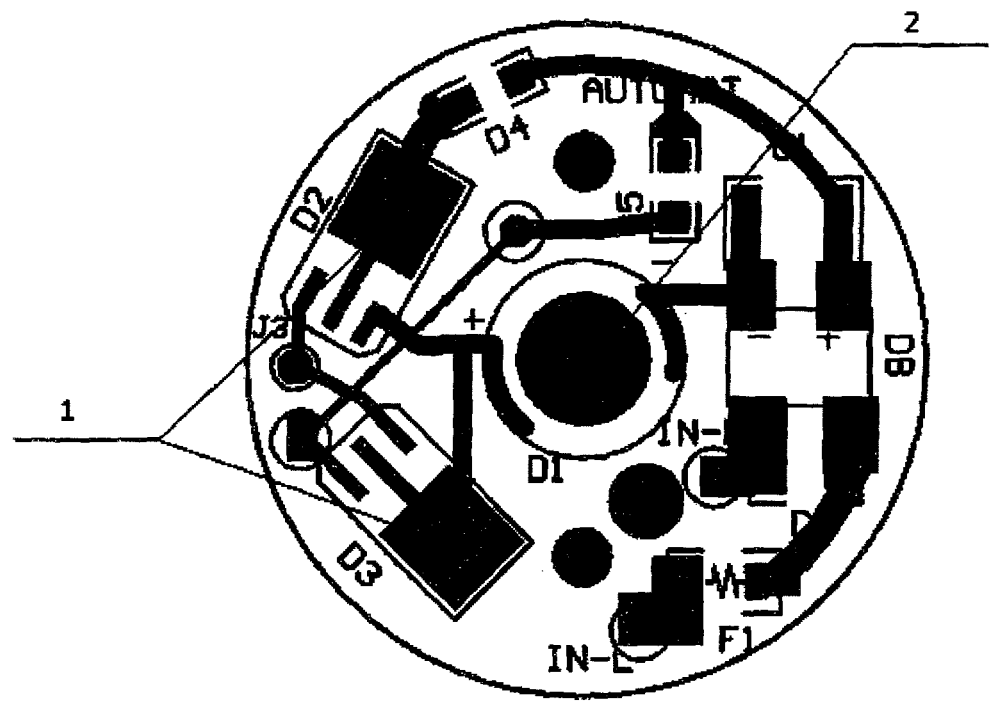
FIG. 12 illustrates a PCB circuit board of a ball lamp of the embodiment 2.

References in the FIG. 12: 1—constant current diode, 2—LED chipset.

DETAILED DESCRIPTION

Hereinafter, the present application will be explained in detail with reference to the accompanying drawings in connection with the embodiments, but the present invention is not limited to this.

Embodiments

According to embodiment 1, a LED lighting method (in DC power supply mode) is provided. In the method, through the constant current effect of a constant current diode (CRD), a power source drives LEDs to emit light and illuminate. The LED light module groups and the CRD are packaged and integrated into a chip to form a LED light module group integrated chip. The CRD has negative power characteristic which enable the integrated chip to have the negative power physical characteristic, too. Thereby, when the operation temperature of the integrated chip is too high, the CRD will automatically reduce the circuit power input in order to reduce the temperature of the integrated chip to protect it from lumens depreciation due to the overheating. An impulse source is utilized to output a controllable impulse. The controllable impulse is rectified by a diode and then the CRD with a controlling end is switched on discontinuously at a controlled impulse frequency such that the LED light module groups can be powered discontinuously by the power supply and the LED light module groups flash discontinuously at the controlled frequency. Therefore, based on a feature that the human eye is not sensitive to high-frequency of flicker, in the case of power supply is halved, the lighting effect of the LED light module groups is near normal lighting effect to achieve energy saving goals, so that the input power is reduced and the LED light module groups can be further protected from lumens depreciation due to the overheating. The power supply can be a super-capacitor C charged by a solar cell or can be a power supply whose AC power is converted by a bridge rectifier circuit to a DC output.

Figure 1:
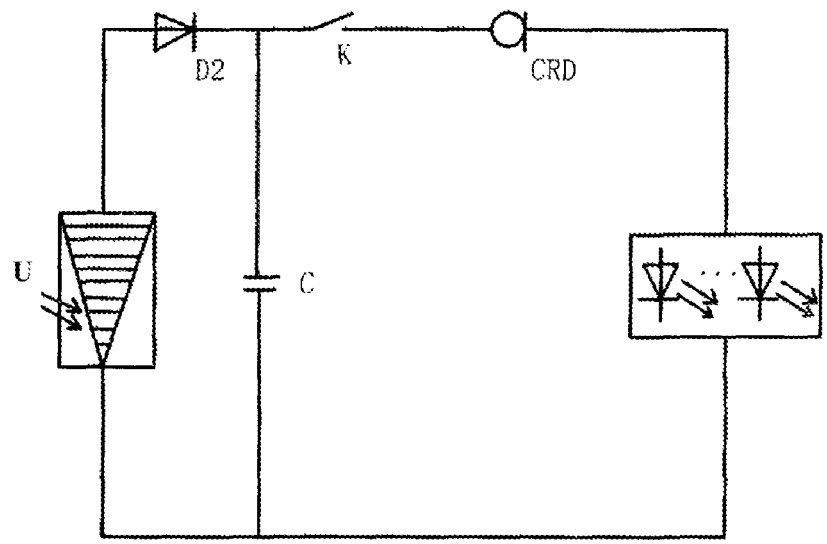
FIG. 1 illustrates a LED lighting device circuit in a solar energy power supply mode according to an embodiment 1.
Figure 2:
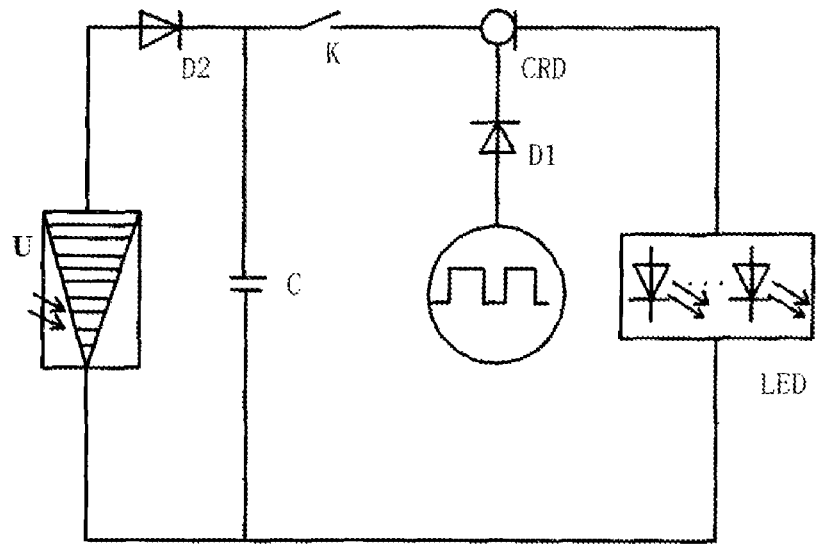
FIG. 2 illustrates a LED lighting device circuit with increased pulse in the solar energy power supply mode according to the embodiment 1.
Figure 3:
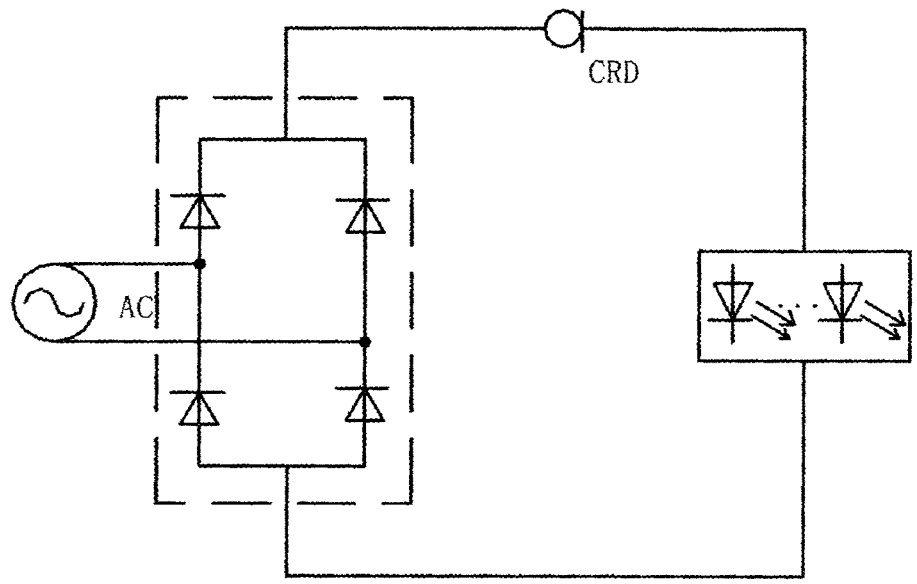
FIG. 3 illustrates a LED lighting device circuit in a DC power supply mode according to the embodiment 1.
Figure 4:
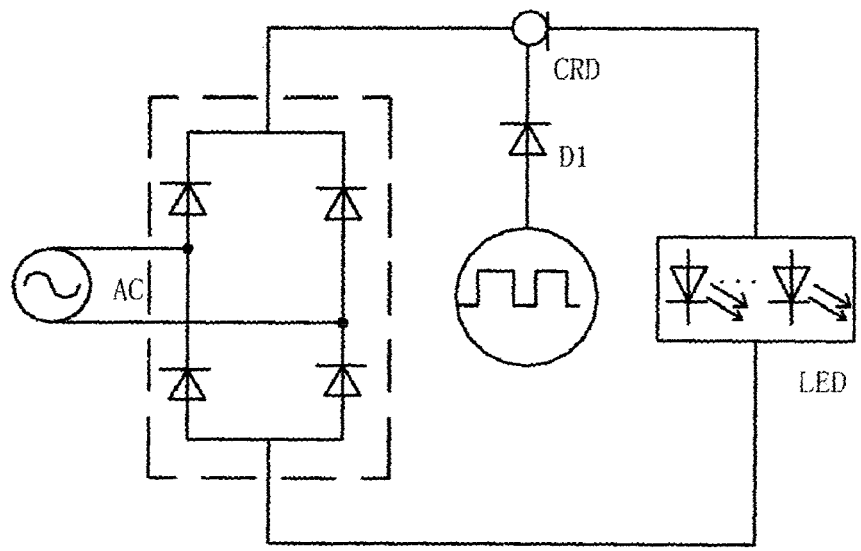
FIG. 4 illustrates a LED lighting device circuit with increased pulse in the DC power supply mode according to the embodiment 1.
Figure 5:
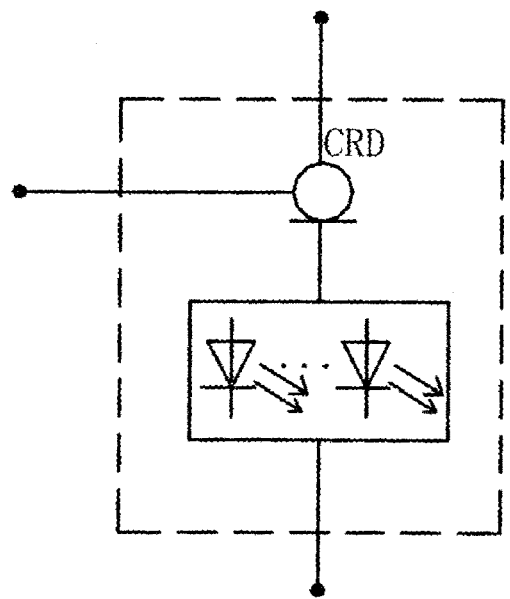
FIG. 5 illustrates a LED light module group integrated circuit structure in the DC power supply mode according to the embodiment 1.
Figure 6:
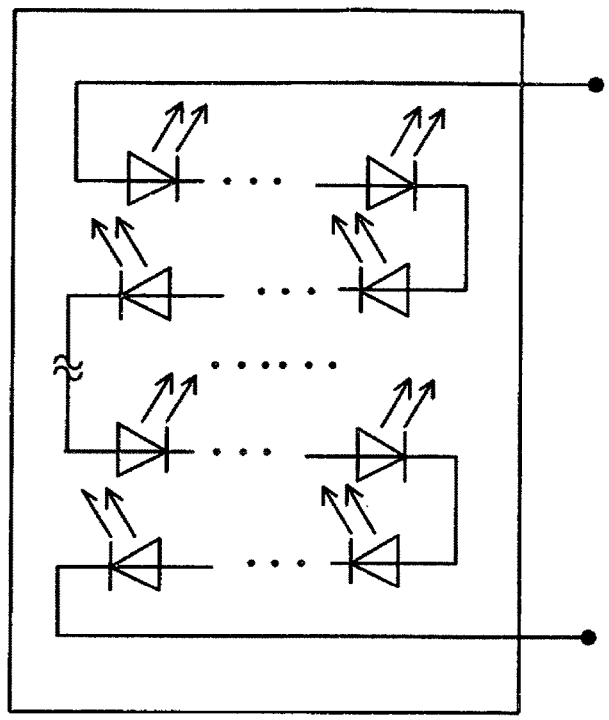
FIG. 6 illustrates a LED light module group array structure in the DC power supply mode according to the embodiment 1.

A LED lighting device for implementing the above-mentioned method is provided. The device includes LED light module groups and a constant current diode (CRD), the LED light module groups and the CRD are connected in series. The LED light module groups are composed of a plurality of LEDs connected in series. The LED light module groups, the CRD and a DC power supply form a closed loop. In the LED light module group, the LEDs are arranged as an array with multiple rows and multiple columns when packaging in the chip (see FIG. 6). The CRD and the LED light module groups are packaged and integrated into the chip (dashed box in FIG. 5). A controlling end of the CRD is connected to a PWM impulse source via a diode D1. The power supply may be a super-capacitor C connected in parallel to both sides of a solar panel U. A rectifier diode D2 is connected in series to the solar panel U (as shown in FIG. 1 and FIG. 2). The power supply also may be an AC power supply (as shown in FIGS. 3 and 4) with both ends connected to bridge rectifier circuits (dashed box).

Specifically, the device may be implemented as follows. The power supply is powered by solar energy. That is, there will be one solar panel U, one super-capacitor C, one rectifier diode D2, one controlling switch K, one PWM impulse source with adjustable impulse width, one rectifier diode D1, one constant current diode 2DHL300 and two LED light module groups. The LED light module groups are connected in series and each uses seven LED dies of 3.2 V and 1 W, wherein the seven LED dies are packaged into an array with 1 row and 7 columns and thus the power of the LED light module groups is 2×7 W, as shown in FIG. 1. The super-capacitor C is charged by the solar cell during the day. When there is a need for lighting, the controlling switch K is turned on, the super-capacitor C is discharged and the impulse source outputs impulse at 200 Hz/S. The controllable constant current diode 2DHL300 is discontinuously switched on at the frequency of 200 Hz/S via the diode D1. The LED light module groups are powered discontinuously at the frequency of 200 Hz/S. The input power tested by an instrument is 7W and the illumination is also 7×80 LM/W. Because the LED light module groups alternately light the afterglow and are powered discontinuously at the frequency of 200 Hz/S, what the human eye can see is continuous light but not the intermittent flash. Therefore, human's visual effect is much greater than the lighting effect of 7W but close to 11W in order to save energy of about 40% on the basis of efficient lighting of the LED.

A LED lighting method in AC power supply mode is further provided. In the method, a parallel group of constant current diodes CRD is utilized to keep the supply current constant and rectified so as to enable the alternating current to drive two series groups of the LED light module groups at the up and down half waves in a period, respectively, such that the two series groups flash alternately. Therefore, based on the feature that the human eye is not sensitive to high-frequency of flicker, in the case of power supply is halved, the lighting effect of the LED light module groups is near normal lighting effect to achieve energy saving goals. The CRD parallel group and the LED light module groups are packaged and integrated into a chip to form a LED light module group integrated chip. The control end of the CRD is guided out to control the LED lighting based on operating time and the illumination of sunshine. For example, the LEDs are turned on automatically according to sunshine or the illumination of the LED is reduced after the middle night. The CRD has negative power characteristic, which makes the LED light module group integrated chip has the negative power physical characteristic, too. Thereby, when the operating temperature of the LED light module group integrated chip is too high, the CRD will automatically reduce circuit power input in order to reduce the temperature of the integrated chip to protect it from lumens depreciation due to the overheating. The power supply can be an electric supply with a power frequency of 50 Hz/S or 60 Hz/S or can be an AC power supply provided by a transducer with a higher power frequency.

Figure 7:
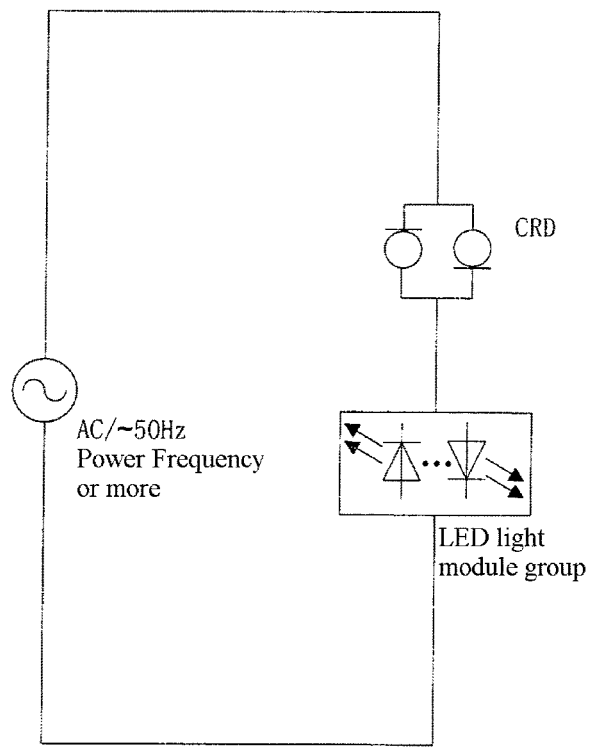
FIG. 7 illustrates a LED lighting device circuit in a AC power supply mode according to the embodiment 1.
Figure 8:
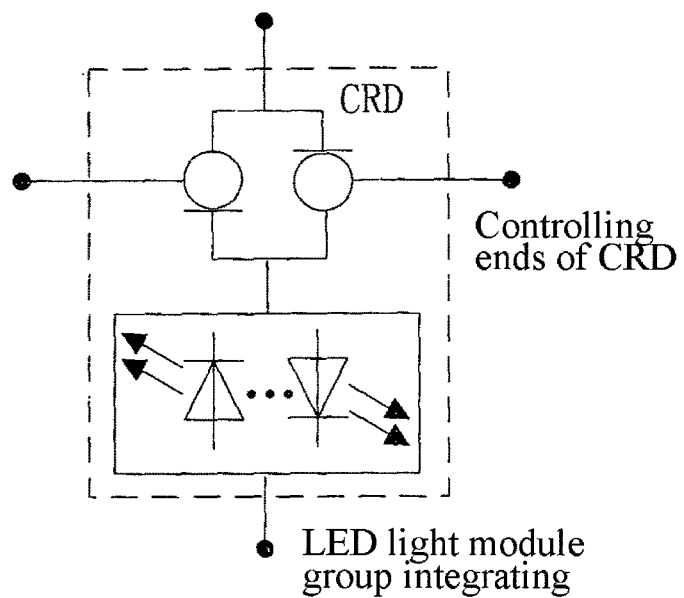
FIG. 8 illustrates a LED light module group integrated circuit structure in the AC power supply mode according to the embodiment 1.
Figure 9:
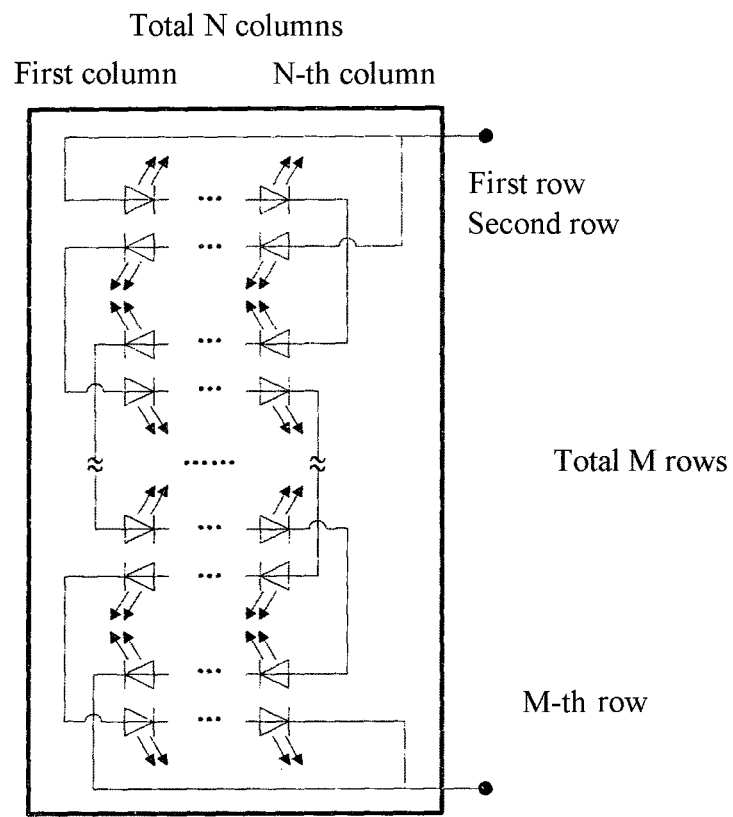
FIG. 9 illustrates a LED light module group array structure in the AC power supply mode according to the embodiment 1.

A LED lighting device in AC power supply mode for implementing the above-mentioned method is provided. As shown in FIG. 7, the device includes a parallel group of constant current diodes composed of a forward connected constant current diode and a backward connected constant current diode and a LED light module group, wherein the LED light module group and the CRD parallel group are connected in series. The CRD parallel group, the LED light module group and the AC power supply form a closed loop. After the LED light module group and the CRD parallel group are connected in series, they are packaged into an integrated chip (see FIG. 8), and the AC power supply and the integrated chip are connected in series to form a closed loop. The LEDs in the LED light module group are arranged to an interval arrangement with one row in forward direction and the adjacent row in backward direction (as the LED light module group with M rows and N columns shown in FIG. 9).

Specifically, the device can be implemented as follows. The electric supply is utilized as the AC power supply, i.e. AC 220 V 50Hz/S; the CRD comprises two constant current diodes 2DHL300 connected positive and negative in parallel; two LED light module groups are connected in series and each uses 72 LED dies of 3.2 V and 1 W, the LED dies are packaged into an array with 8 rows and 9 columns and thus the power of the LED light module groups is 2×72 W. During the upper half cycle of the AC, the CRD in the LED light module groups are forward conductive, and thus the rows 1, 3, 5 and 7 are lighting. During the lower half cycle of the AC, the CRD in the LED light module groups are backward conductive, and thus the rows 2, 4, 6 and 8 are lighting. The input power tested by an instrument is 72W and the illumination is also 72×80 LM/W. Because the LED light module groups light alternately the afterglow and the AC frequency of 50 Hz/S (higher frequency would be better), what the human eye can see is continuous light but not the intermittent flash. Therefore, human's visual effect is much greater than the lighting effect of 72W but close to 110W in order to save energy of about 40% on the basis of efficient lighting of the LED.

Figure 10:
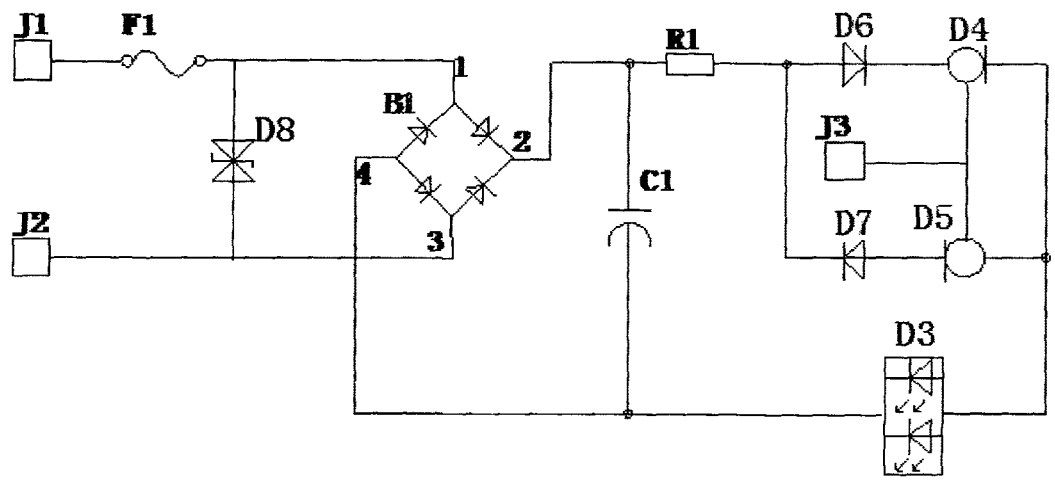
FIG. 10 is a schematic structural diagram of example 2.
Figure 11:
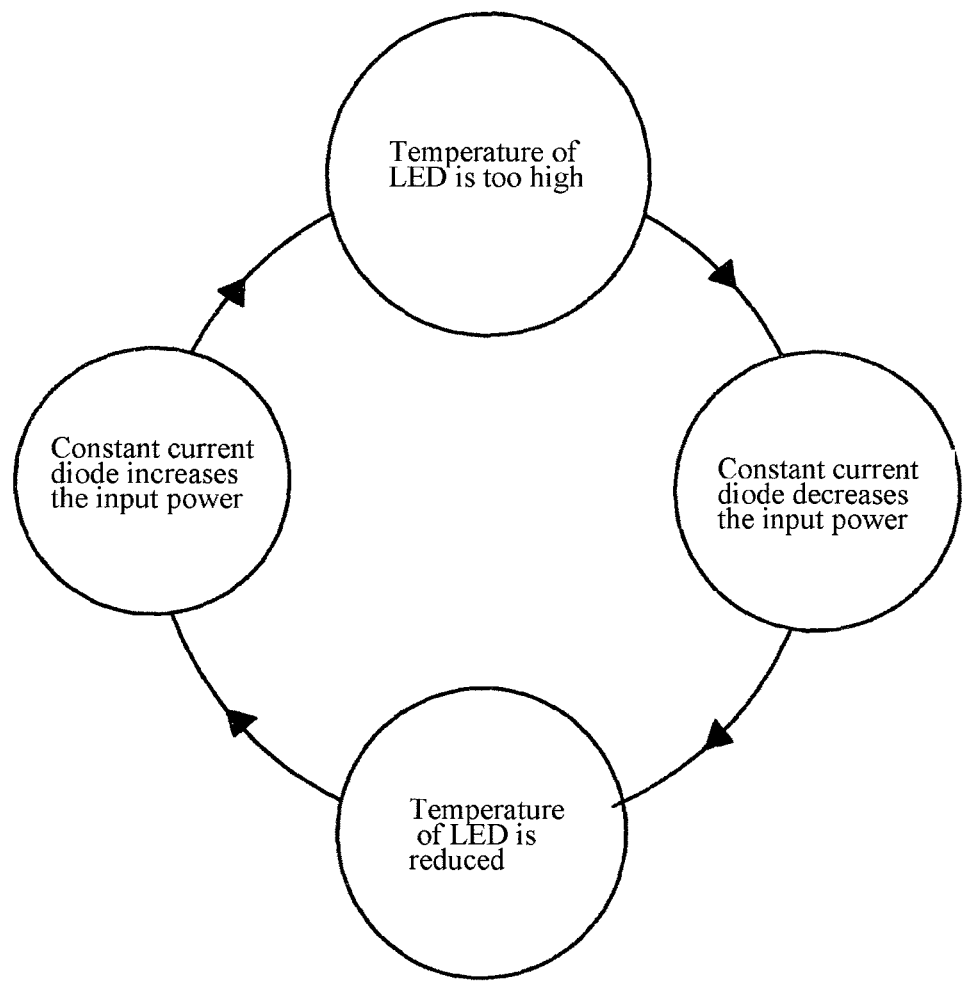
FIG. 11 is a principle schematic diagram of improving the luminous efficiency of the LED.

An AC/DC LED lighting circuit for implementing the above two methods is provided. As shown in FIG. 10, the circuit includes two supply terminals J1 and J2, a rectifier bridge B1 whose input end is connected to the supply terminals J1 and J2, a LED light module group D3, a constant current diode CRD D4 and a diode D6 connected to an output end of the rectifier bridge B1. The LED light module group D3, the CRD D4 and the diode D6 are connected in series. Further, the CRD D4 and the diode D6 are connected in parallel to a series circuit of a CRD D5 and a diode D7, in which the conductive direction of D4 and D6 is opposite to the direction of D5 and D7. The CRD D4 and D5 are arranged to groups with a plurality of series or parallel CRDs. The supply terminals J1 and J2 are connected with a transient diode D8, and the supply terminal J1 is further series connected with a resettable fuse F1. The output end of the rectifier bridge B1 is further connected with a filter capacitor C1 in parallel. The series circuit formed by the LED light module group D3, the CRD D4 and the diode D6 is further connected with a resistor R1 in series. Control ends of the CRDs D5 and D4 are connected to a preparatory terminal J3. The terminal J3 can be connected to a PWM impulse source to supply the impulse output to the LED light module groups.

The operating principle of the AC/DC LED lighting circuit is as follows: when the circuit is powered by AC, the terminals J1 and J2 are connected to the AC power supply, but the rectifier bridge B1 and the filter capacitor C1 are not weld into the circuit. The rectifier bridges 1-2 and 3-4 are shorted, the LED light module groups D3 are composed of multiple LED groups connected in forward series and the multiple LED groups connected in backward series, and the forward series LED groups and the backward series LED groups are connected in parallel.

When the circuit is powered by DC, the terminals J1 and J2 are connected to the AC power supply, but the CRD D5 and diode D7 are not weld into the circuit (in this state, D5 and D7 have no function and thus are omitted for saving the cost). The LED light module group D3 is composed of multiple LED groups connected in series in the same direction.

According to embodiment 2, a method for improving the luminous efficiency of LED is provided. In the method, a LED drive current is controlled by a constant current diode, at the same time the LED is used as a heat source of the constant current diode. When the operating temperature of the LED is higher than the control temperature, ambient temperature of the constant current diode is heated by the heat source to a temperature above the prohibited temperature, such that the rated power supplied from the constant current diode to the LED decreases as the ambient temperature increase, so as to protect the temperature of the LED from continuing to rise. And thus it avoids the luminous efficiency of the LED to be reduced due to the overheating. An operating mode between the LED and the constant current diode is formed to enable the LED and the constant current diode to adjust for each other on the basis of feedback.

The prohibited temperature can be an upper limit of the ambient temperature at which the constant current diode can keep normal constant current characteristic. When the ambient temperature is higher than the prohibited temperature, the rated power of the constant current diode decreases as the ambient temperature increases. Generally, the prohibited temperature can be about 60° C.

A method for using the LED as a heat source of the constant current diode includes a step of arranging the operating LED and the constant current diode together or connecting the operating LED to the constant current diode via heat-conducting medium. The LED can also cooperate with other heating elements in the LED lighting circuit to provide a basis temperature for the constant current diodes in order to compensate the loss of heat conduction from the LED to the constant current diode, so that the temperature of the constant current diode can real-time and accurately reach the operating temperature of the LED. A control temperature may also be changed by adjusting the basis temperature. The control temperature may be the temperature that the LED cannot exceed, such as about 50° C. When the control temperature is reached, the heat from the LED and the heating elements designed to heat the constant current diode will enable the temperature of the constant current diode to reach the prohibited temperature of 60° C. It is assumed that the heat from the heating elements is increased and thus the ambient temperature is improved, the constant current diode can be heated to the prohibited temperature of 60° C. in the situation that the temperature of the LED is lower than or close to 50° C. That is, the control temperature of the LED is decreased.

Figure 13:
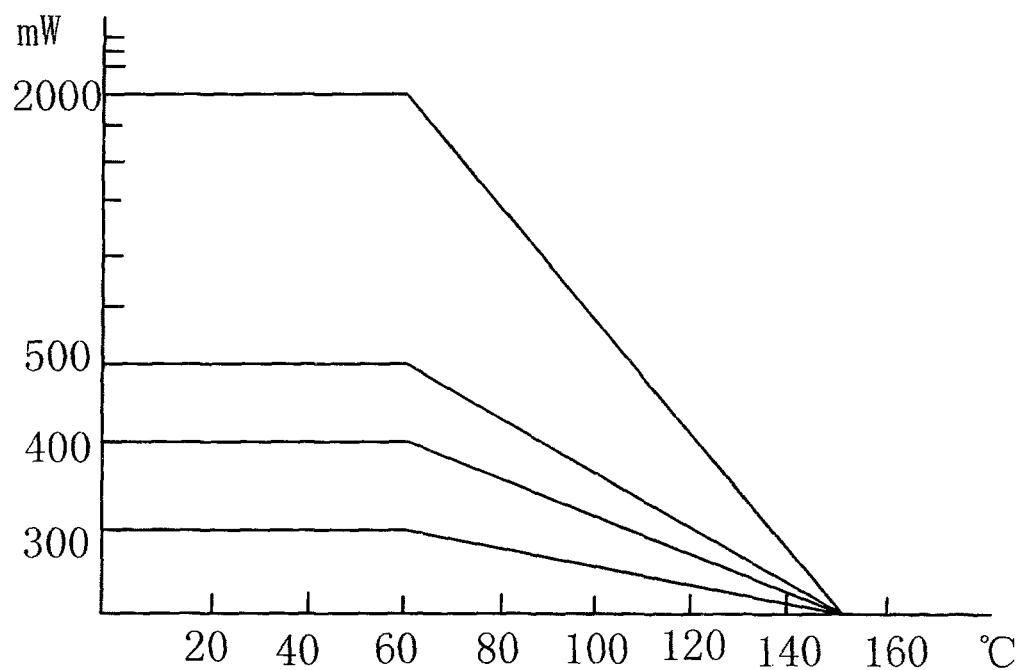
FIG. 13 is a graph illustrating the constant current diode output power versus the temperature.

FIG. 12 illustrates a PCB ball bubble lamp circuit board, which may be a PCB aluminum plate (the aluminum plate may be the efficient heat-conduction medium). The operating principle of the PCB ball bubble lamp circuit board is as follows: a LED chip group 2 is powered by a constant current diode 1 and the constant current diode 1 provides a stable current output. When the temperature of the LED chip group 2 increases to reach a control temperature after the LED chip group 2 operates for a long time, the ambient temperature of the constant current diode 1 close to the LED chip group 2 reaches a prohibited temperature (about 60° C.). The control temperature may be determined on the basis of characteristic of the LED chip group 2 or specific requirements. As shown in FIG. 13, when the temperature rises again, the rated power output from the constant current diode 1 decreases with the increase of the temperature, so that the output power of the LED chip group 2 decreases and thus the operating temperature decreases gradually, then the rated power output from the constant current diode 1 rises again until the operating temperature of the LED chip group 2 increases again to about 60° C. The above steps are repeated. Therefore, the LED chip group 2 always operates at a relatively low temperatures and the luminance will be not too low in order to suppress the light fades and thus to improve the luminous efficiency of the LED and to ensure the normal life of LED.

According to embodiment 3, an integrating method of a LED lighting circuit includes a step of packaging a rectifier circuit (including a rectifier bridge and/or a rectifier diode), a constant current diode and a LED in the LED lighting circuit together to form a LED lighting integrated chip (the circuit structure as shown in FIG. 1). The LED lighting integrated chip may also be formed by packaging the existing rectifier circuit chip (bare chip), the constant current diode chip (bare chip) and the LED chip (bare chip) into a LED support, wherein such bare chips share a package. The LED lighting integrated chip leads out a adjust end of the constant current diode and a power interface. The LED lighting integrated chip further leads out a wire to connect to a capacitor (generally the capacitor may be not welded into the circuit). The LED lighting circuit includes a power supply, the both sides of the power supply are connected to input ends of a rectifier bridge B2, output ends of the rectifier bridge B2 are connected to a LED light module group D9 composed of LED, a constant current diode D10 and a diode D12. The LED light module group D9, the constant current diode D10 and the diode D12 are connected in series. The constant current diode D10 and the rectifier diode D12 are connected in parallel with the series circuit of the constant current diode D11 and the rectifier diode D13, in which the conductive direction of D10 and D12 is opposite to the conductive direction of D11 and D13. The constant current diodes D10 and D11 are constant current diode group with multiple series or parallel constant current diodes. The output ends of the rectifier bridge B2 further connected with a filter capacitor C2 in parallel.

Figure 14:
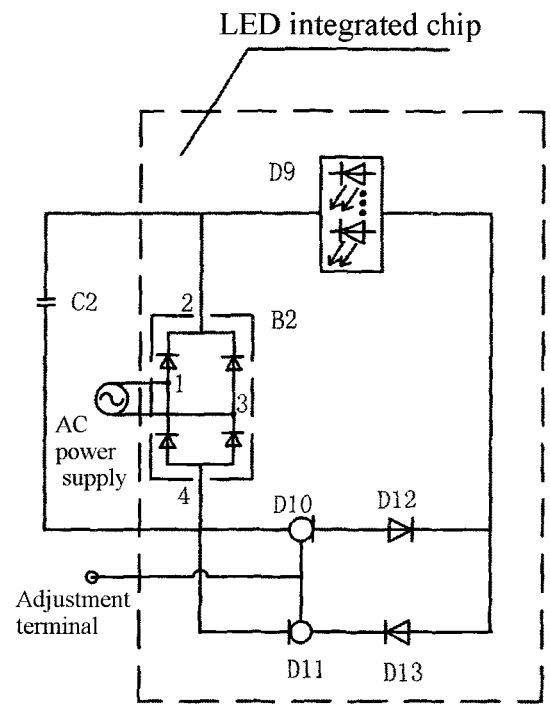
FIG. 14 a principle schematic diagram of the present invention.

As shown in FIG. 14, a LED lighting integrated chip includes a rectifier circuit chip, a constant current diode chip and a LED chip in a LED lighting circuit, and the rectifier circuit chip, the constant current diode chip and the LED chip are packaged into a LED support. The rectifier circuit includes a rectifier bridge and/or a rectifier diode. The LED lighting integrated chip leads externally a adjust end of the constant current diode and a power interface. The LED lighting integrated chip is further provided with a wire to connect to a capacitor. The LED lighting circuit includes a power supply, the both sides of which are connected to input ends of a rectifier bridge B2. Output ends of the rectifier bridge B2 are connected to a LED light module group D9 composed of LED, a constant current diode D10 and a diode D12. The LED light module group D9, the constant current diode D10 and the diode D12 are connected in series. The constant current diode D10 and the rectifier diode D12 are connected in parallel with the series circuit of the constant current diode D11 and the rectifier diode D13, in which the direction of D10 and D12 is opposite to the direction of D11 and D13. The constant current diodes D10 and D11 are constant current diode group with multiple series or parallel constant current diodes. The output ends of the rectifier bridge B2 further connected with a filter capacitor C2 in parallel.

Figure 15:
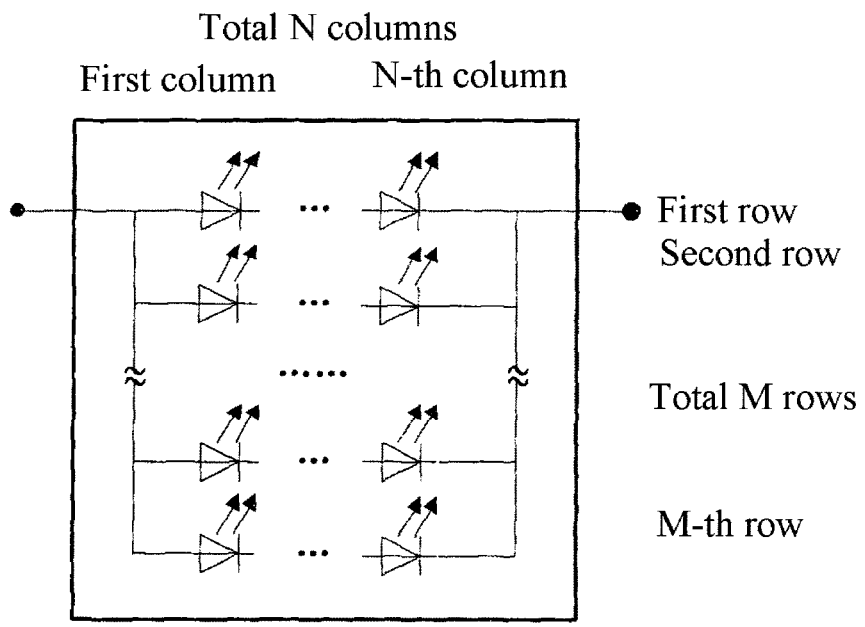
FIG. 15 is a LED optical module circuit connection diagram in the DC mode according to embodiments of the present invention.
Figure 16:
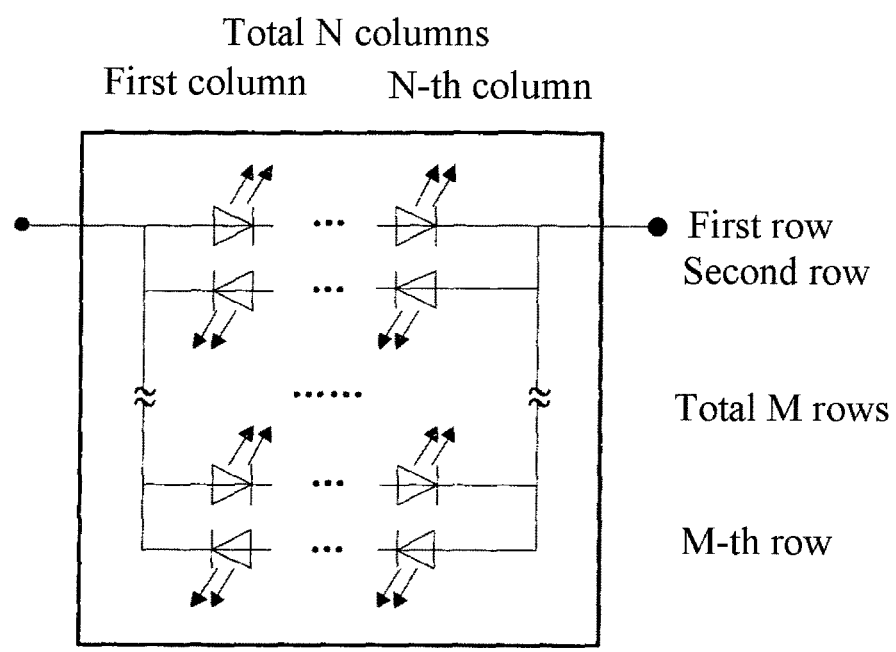
FIG. 16 is a LED optical module circuit connection diagram in the AC mode according to embodiments of the present invention.

In a DC power supply mode, the elements D11, D12, D13 and D9 in FIG. 14 are removed and a configuration shown in FIG. 15 can be used. That is, the configuration is composed of a plurality of LEDs connected in series in the same direction and the plurality of LEDs are arranged to M rows and N columns. In an AC power supply mode, the rectifier bridge B2 in FIG. 14 is removed and the points 1, 2, 3 and 4 in the circuit are directly connected, and D9 uses a structure shown in FIG. 16. That is, the structure is composed of a plurality of LED groups connected in series in a forward direction and a plurality of LED groups connected in series in a backward direction, and the forward LED groups and the backward LED groups are connected in parallel and are arranged to M rows and N columns. The integrated chip leads externally a terminal of a adjust end, two terminals of a power supply and two connecting terminals of a capacitor (generally, the connecting terminals of the capacitor may be not leaded).

What is claimed is:
1. A LED lighting device comprising:
an LED array composed of a plurality of LED light module groups, each LED light module group comprising a plurality of LEDs connected in series; and
at least one constant current diode configured to keep a current received from a power supply constant and to drive the LEDs in the plurality of LED light module groups to emit light via the constant current,
wherein the constant current diode has negative power characteristic, thereby, when an operating temperature of an integrated chip on which the LED lighting device is arranged is too high, the constant current diode will automatically reduce a circuit power input supplied to the plurality of LED light module groups to reduce the temperature of the integrated chip so as to protect it from lumens depreciation due to overheating,
wherein the LED lighting device further comprises:
a PWM impulse source connected to a control in end of the constant current diode via a diode, wherein the PWM impulse source outputs a controllable impulse, the controllable impulse are rectified by the diode and then are input into the controlling to enable the constant current diode to be switched on discontinuously at a controlled impulse frequency, such that the LED light module groups flash discontinuously at the controlled frequency, thereby, based on a feature that the human eye is not sensitive to high-frequency of flicker, in the case of power supply is halved, a lighting effect of the LED light module groups is near normal lighting effect.
2. The LED lighting device according to claim 1, wherein the power supply is a super-capacitor connected in parallel to both sides of a solar panel, wherein the super-capacitor is charged by the solar panel during the day, when the LED lighting device is needed to be driven, the super-capacitor is discharged to supply power to the plurality of LED light module groups.

3. The LED lighting device according to claim 1, wherein the frequency of the controllable impulse output by the PWM impulse source is 200 Hz/S.

4. The LED lighting device according to claim 1, wherein the power supply is an AC power supply with both ends connected to bridge rectifier circuits, the at least one constant current diode comprise a parallel group of constant current diodes composed of a forward connected constant current diode and a backward connected constant current diode, and the plurality of LED light module groups comprise a parallel group composed of multiple lines of LED groups connected in series in a forward direction and multiple lines of LED groups connected in series in a backward direction, such that the alternating current is enabled to drive two parallel groups of the LED light module groups at the up and down half waves in a period, respectively, such that the two series groups flash alternately, based on a feature that the human eye is not sensitive to high-frequency of flicker, in the case of power supply is halved, the lighting effect of the LED light module groups is near normal lighting effect.

5. The LED lighting device according to claim 4, wherein the multiple lines of LED groups connected in series in a forward direction and the multiple lines of LED groups connected in series in a backward direction are arranged to an interval arrangement with one row in forward direction and the adjacent row in backward direction.

6. The LED lighting device according to claim 4, wherein the constant current diode and the LED light module groups are packaged in the integrated chip, and wherein the LED in the LED light module groups are used as heat sources of the constant current diode, when the operating temperature of the LED is higher than a control temperature, the ambient temperature of the constant current diode is heated to a temperature above a prohibited temperature, such that a rated power supplied from the constant current diode to the LED decreases as the ambient temperature increases, so as to protect the temperature of the LED from rising to avoid a luminous efficiency of the LED to be reduced due to overheating.

7. The LED lighting device according to claim 1, wherein the plurality of LED light module groups are connected in series.

8. A method for forming a LED lighting device comprising:

providing a plurality of LED light module groups in the LED lighting device in an array; and connecting at least one constant current diode between the plurality of LED light module groups and a power supply, the at least one constant current diode is configured to keep a current received from a power supply constant and to drive the LEDs in the plurality of LED light module groups to emit light via the constant current, wherein the constant current diode has negative power characteristic, thereby, when an operating temperature of an integrated chip which is used to provide the LED lighting device is too high, the constant current diode will automatically reduce a circuit power input supplied to the plurality of LED light module groups to reduce the temperature of the integrated chip so as to protect it from lumens depreciation due to overheating, wherein the method further comprises:

connecting a PWM impulse source to a controlling end of the constant current diode via a diode, the PWM impulse source outputs a controllable impulse, the controllable impulse are rectified by the diode and then are input into the controlling end to enable the constant current diode to be switched on discontinuously at a controlled impulse frequency, such that the LED light module groups flash discontinuously at the controlled frequency, thereby, based on a feature that the human eye is not sensitive to high-frequency of flicker, in the case of power supply is halved, a lighting effect of the LED light module groups is near normal lighting effect.

9. The method according to claim 8, wherein the power supply is a super-capacitor connected in parallel to both sides of a solar panel, wherein the super-capacitor is charged by the solar panel during the day, when the LED lighting device is needed to be driven, the super-capacitor is discharged to supply power to the plurality of LED light module groups.

10. The method according to claim 9, wherein the frequency of the controllable impulse output by the PWM impulse source is 200 Hz/S.

11. The method according to claim 8, wherein the power supply is an AC power supply with both ends connected to bridge rectifier circuits, the at least one constant current diode comprise a parallel group of constant current diodes composed of a forward connected constant current diode and a backward connected constant current diode, and the plurality of LED light module groups comprise a parallel group composed of multiple lines of LED groups connected in series in a forward direction and multiple lines of LED groups connected in series in a backward direction, such that the alternating current is enabled to drive two parallel groups of the LED light module groups at the up and down half waves in a period, respectively, such that the two series groups flash alternately, based on a feature that the human eye is not sensitive to high-frequency of flicker, in the case of power supply is halved, the lighting effect of the LED light module groups is near normal lighting effect.

12. The method according to claim 11, wherein the multiple lines of LED groups connected in series in a forward direction and the multiple lines of LED groups connected in series in a backward direction are arranged to an interval arrangement with one row in forward direction and the adjacent row in backward direction.

13. The method according to claim 8, further comprising:

packaging the constant current diode and the LED light module groups into the integrated chip, such that the LED in the LED light module groups are used as heat sources of the constant current diode, wherein when the operating temperature of the LED is higher than a control temperature, the ambient temperature of the constant current diode is heated to a temperature above a prohibited temperature, such that a rated power supplied from the constant current diode to the LED decreases as the ambient temperature increases, so as to protect the temperature of the LED from rising to avoid a luminous efficiency of the LED to be reduced due to overheating.

14. The method according to claim 8, wherein the plurality of LED light module groups are connected in series.

15. A LED lighting integrated chip comprising:

LED lighting circuit comprising a rectifier circuit chip;

a constant current diode chip; and a LED chip, wherein the rectifier circuit chip, the constant current diode chip and the LED chip are packaged into a LED support;
wherein
the rectifier circuit comprises a rectifier bridge;
the constant current diode chip comprises a first constant current diode, a second constant current diode, a first rectifier diode and a second rectifier diode,
the LED lighting circuit further comprises a power supply, both sides of the power supply are connected to input ends of the rectifier bridge, output ends of the rectifier bridge are connected to a LED light module group, the first constant current diode and the first rectifier diode,
the LED light module group, the first constant current diode and the first rectifier diode are connected in series;
the first constant current diode and the first rectifier diode are further connected parallel to a series circuit composed of the second constant current diode and the second rectifier diode;
wherein the directions of the first constant current diode and the first rectifier diode are opposite to the directions of the second constant current diode and the second rectifier diode,
the first constant current diode and the second constant current diode are composed of a plurality of constant current diodes connected in series or parallel.

16. The LED lighting integrated chip according to claim 15, wherein output ends of the rectifier bridge are further connected with a filter capacitor in parallel.

* * * * *